Aug. 12, 1930.          F. M. BOSWORTH          1,772,453
                        FLEXIBLE CONDUIT
                      Filed March 23, 1928
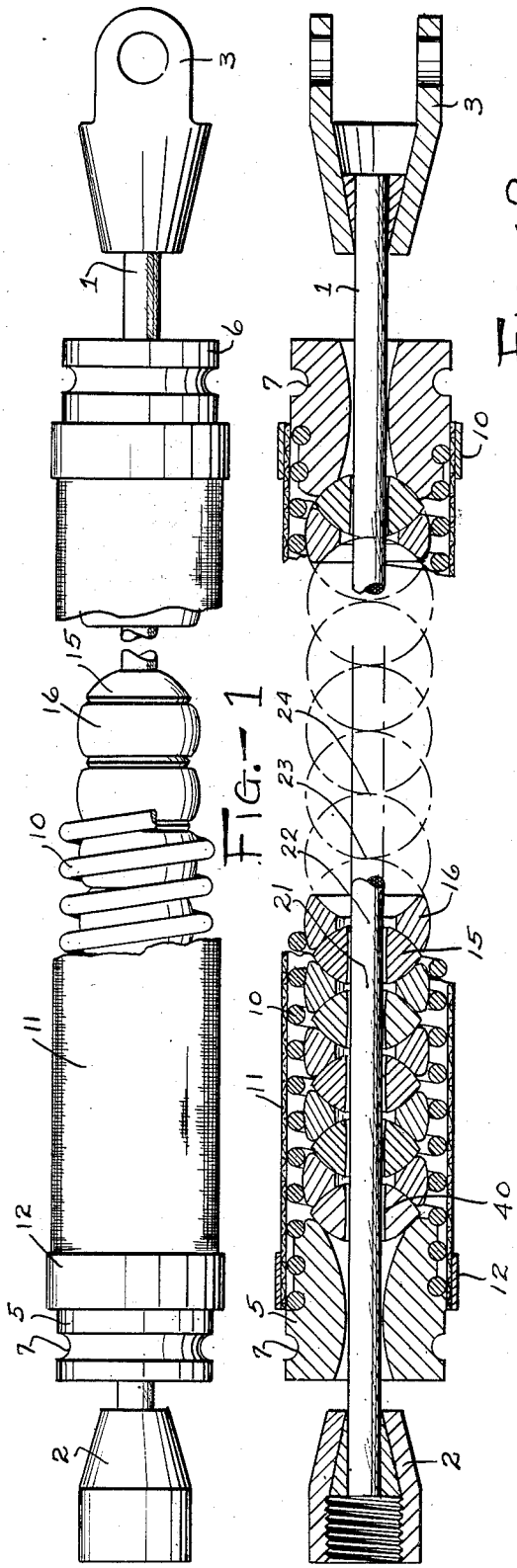
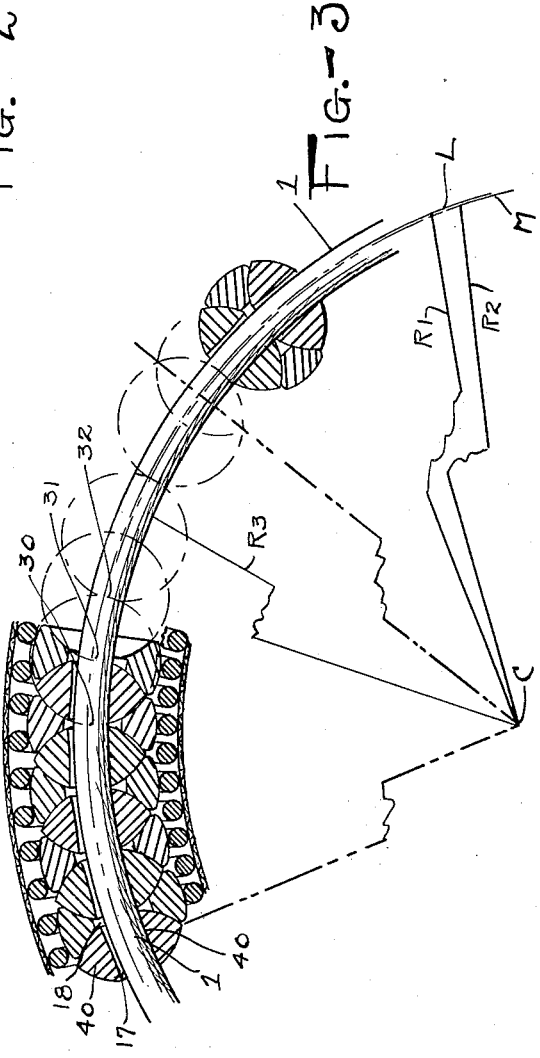

Patented Aug. 12, 1930

1,772,453

UNITED STATES PATENT OFFICE

FREDERIC M. BOSWORTH, OF CLEVELAND, OHIO, ASSIGNOR TO THE MIDLAND STEEL PRODUCTS COMPANY, OF CLEVELAND, OHIO, A CORPORATION OF OHIO

FLEXIBLE CONDUIT

Application filed March 23, 1928. Serial No. 264,231.

This invention relates to flexible conduits and particularly to the conformation and arrangement of pieces included in the assembled conduit.

It is among the objects of my invention to arrange a flexible force transmitting device which may be suitable to transmit force from an automobile chassis hook-up to an automobile brake mounted on a swiveling wheel. A more specific object is to provide a flexible incompressible conduit through which may pass a flexible inextensible member such as a cable. A further object is to provide conduit units which can be made with little expense and which are shaped to coact with each other and with the cable so that variations in curvature of the conduit will not cause a relative change in length between the cable and the conduit. A further object is to provide ample bearing surface between the cable and the conduit to reduce wear and to extend the life of the device. Another object is to correlate the design of the inner surfaces of the conduit with the minimum radius of curvature of the conduit. A further object is to compensate and balance theoretical changes in length between the cable and the conduit in curvature so that they negative each other and keep the amount of cable housed in the conduit constant regardless of curvature.

Other objects will appear from the following detailed description of the structure illustrating a preferred form of my invention. The essential characteristics are summarized in the claims.

In the drawings, Fig. 1 is a partially broken view of a completely assembled device including a conduit and cable; Fig. 2 is a partially detailed and partially diagrammatic longitudinal section of the assembled units; Fig. 3 is a similar showing of the units in curvature.

Referring particularly to Fig. 1, I designate at 1 a cable which extends freely through the conduit and is shown to have suitable yokes or similar devices 2 and 3 secured to its ends. The conduit has end units 5 and 6 in which are provided annular grooves 7, or similar means, by means of which these end members can be fixed or secured to relatively stationary parts between which it is desired to transmit force. Thus the end members 5 and 6 of the conduit might be secured to the frame of a vehicle and to the apron or backplate of the brake respectively, and the ends of the cable 2 and 3 might be secured to the brake linkage and the shoe spreading mechanism respectively.

In Fig. 1 there is shown an extended coil spring 10 secured at each of its ends to the members 5 and 6 which tends to draw the members together and compress the several units upon each other. The coils of the spring are spaced apart and kept out of contact when the conduit is in curvature. A suitable dust cover 11 overlies the assembly and may be secured to the end members by suitable means such as ferrules 12. The dust cover may perform the additional function of retaining lubricant.

Referring particularly to Fig. 2, it will be seen that the conduit proper comprises a plurality of units 15 and 16 disposed between the end members and encompassed by the coil spring 10. The members 15 and 16 engage each other along spherical surfaces determined by the surfaces of spheres whose centers preferably lie in the axis of the conduit and in the surfaces of each other, so that as the conduit is curved, the surfaces retain their contact. Thus in laying out the several units, circles are struck from centers 20, 21, 22, 23, 24, etc., lying in the circumference of adjacent circles. Sections of the units 15 are developed within areas common to two adjacent circles and sections of the units 16 are developed in the intermediate space included in only one circle. The internal diameter of the coil spring 10 may substantially equal the diameter of the circles or spheres and thus maintain lateral engagement with the units 16 in all positions. The end members may have characteristics of either the members 15 and 16. As illustrated, the end members 5 and 6 present concave surfaces to units 15. It will further appear that the conduit units 15 present on both sides convex surfaces to adjacent units and that the units 16 present complementary concave surfaces to neighboring units 15.

Referring to Fig. 3, the position of the several units are shown when the conduit is in maximum curvature. The arc of the longitudinal axis L of the conduit is struck from the center C with a radius $R^1$ which equals the minimum radius of curvature of the conduit. Along the arc, from centers 30, 31, 32, etc., are struck circles equal to those of Fig. 2. The arcuate distance 30—31 is slightly greater than the straight line 30—31 and to this extent, the cable tends to be drawn into the conduit as the conduit is curved. To compensate for this, a small clearance is provided between the cable and the inner surface of the conduit so that the center line of the cable lies in a slightly smaller arc M, defined by the radius $R^2$. It will be seen therefore, that between given points, the arc M is slightly shorter than the arc L. In the preferred form of my invention the difference between these arcs equal the sum of the differences between the arcs 30—31 and the straight line distances 30—31.

The units 15 have central flared apertures 17 of least diameter in the middle of the unit and with greatest diameter at the ends. The walls of these apertures are curved as indicated along the lines 40. The least diameter of these apertures equals the diameter of the cable 1 plus tolerance for variation in cable size and a determinable clearance mentioned above. The units 16 are formed as rings with central apertures 18, the diameters of which may exceed the diameters of the cable so that when the conduit is curved, the rings may move bodily transversely of the cable.

The walls of the apertures 17 as defined by the lines 40 have a radius $R^3$ struck from the center C. The radius $R^3$ equals the radius $R^1$ less half the diameter of the cable and the normal clearance between the cable and the inside of the units. When the cable is in tension, it is drawn into contact with all of the units 15 along lines 40 and is fully supported thereby as shown in Fig. 3. The curvature of the walls of the aperture 17 may be described as being struck from a center lying in a plane which bisects the unit, with a radius equal to the minimum radius of curvature of the conduit less the sum of the radius of the cable and the normal clearance between the cable and the conduit.

It will appear from the foregoing that conduits made in accordance with the teaching of this invention, when used in connection with a cable or similar element, constitute a flexible force transmitting device, which will deliver equal motions regardless of the curvature of the device within the limits of the design of maximum curvature. It will appear that all of the parts constituting the conduit are of simple conformation and can be cheaply made and assembled.

While the foregoing is a description of a preferred form of my invention, changes within its scope will occur to those skilled in the art and I do not care to be limited other than by the claims appended hereto.

I claim:

1. A flexible conduit comprising alternate units having convex surfaces and alternate units having concave surfaces engaging each other and having areas of contact intersecting at least the plane of curvature of the conduit in circles whose centers lie in the circumferences of each other.

2. A flexible conduit comprising alternate units having convex surfaces and alternate units having concave surfaces engaging each other and having areas of contact defining intersecting spheres whose centers lie in the surfaces of each other.

3. A conduit formed of interfitting links at least some of which have oppositely facing convex end walls defining intersecting spheres whose centers lie in the axis of the link and in the surfaces of each other, whereby each link is wholly contained within the space common to both spheres.

4. A conduit formed of interfitting links at least some of which have oppositely facing convex end walls defining intersecting spheres whose centers lie in the axis of the link and in the surfaces of each other, whereby each link is wholly contained within the space common to both spheres, the remaining links having oppositely facing concave end walls and being disposed without the space common to the said intersecting spheres.

5. A conduit comprising a plurality of interfitting links of which alternate links have oppositely facing convex spherical end walls defining spheres whose centers lie in the surfaces of each other and in the longitudinal axis of the conduit, two of said links being contained within one such sphere and having remote end walls lying in its surface.

6. A conduit comprising a plurality of interfitting links of which alternate links have oppositely facing convex spherical end walls defining spheres whose centers lie in the surfaces of each other and in the longitudinal axis of the conduit, two of said links being contained within one such sphere and having remote end walls lying in its surface, and links with concave surfaces engaging said last named end walls and being disposed without said last named sphere.

7. A conduit comprising a plurality of interfitting links of which alternate links have oppositely facing convex spherical end walls defining spheres whose centers lie in the surfaces of each other and in the longitudinal axis of the conduit, two of said links being contained within one such sphere and having remote end walls lying in its surface, and a third link having concave spherical surfaces disposed between said two first named links and generally disposed within the body of said last named sphere.

8. A flexible conduit comprising a plurality of interfitting units of which alternate units have concave end surfaces defining equal spheres whose surfaces contact in the axis of the conduit, alternate units having convex spherical surfaces whose remote surfaces lie in a sphere equal to said first named sphere the center of which lies in the point of contact of said first named spheres, end members both presenting concave surfaces to said last named unit, and an extended coil spring secured at its ends to said end members and overlying said interfitting units and laterally engaging at least part of them and having an internal diameter substantially equal to the diameter of said spheres.

9. The combination of a cable and a flexible conduit comprising complementary parts engaging each other one of said parts engaging the cable particularly in curvature and intersecting the plane of curvature in substantially triangular sections on opposite sides of the cable, the other of said parts being laterally shiftable with relation to the first named parts as the conduit curves whereby the arcuate zone of the conduit between the cable and the center of curvature has a decreasing mean length proportionate to the curvature which permits the cable to lie in an arc whose length substantially equals the length of the same piece of cable in straight line.

10. The combination of a cable and a longitudinally incompressible flexible conduit through which the cable may freely move, said conduit comprising means which intersect the plane of curvature in substantially triangular sections having convex curved sides of which one is engageable with the cable particularly in curvature, and means for spacing said first named means longitudinally engaging the other sides of said sections and not engaging the cable and shiftable laterally with relation to the cable and to said first named means proportionate to the curvature of the conduit, whereby the arcuate zone of the conduit between the cable and the center of curvature has a decreasing mean length proportionate to the curvature of the conduit and the length of the length of the longitudinal axis of the conduit remains substantially constant during curvature.

11. The combination of a cable and a hollow flexible conduit therefor, comprising interfitting members all having central apertures for reception of the cable, alternate members contained within intersecting spheres presenting convex surfaces at both ends defined by the spheres, and interfitting members spacing said alternate members apart and shiftable laterally of the cable to permit the portions of the first members lying toward the center of curvature to crowd together in curvature, the apertures in said first members being of greater diameter than the diameter of the cable whereby the cable in tension lies in a smaller arc than the curved longitudinal axis of the conduit to compensate for the conduit creeping upon the cable in curvature and whereby the amount of cable housed within the conduit is the same in straight line position and in position of maximum curvature.

12. A flexible incompressible conduit comprising interfitting parts engaging each other, one order of parts comprising a class which are intersected by the plane of curvature of the conduit in substantially triangular sections on opposite sides of the axis of the conduit and another order of parts comprising a class for spacing the parts of the first class apart, the parts constituting said last named class being laterally shiftable with relation to the first class as the conduit curves and permitting the parts of the first class to move closer together in curvature on the side of the axis of the conduit toward the center of curvature, whereby the length of the axis of the conduit in curvature substantially equals the length of the conduit in straight line.

13. The combination of a cable and a flexible conduit comprising cooperative parts engaging each other, one of said parts encircling and engaging the cable particularly in curvature and presenting a smooth rounded surface thereto for slidably supporting said cable at least in curvature, the other of said parts being laterally shiftable with relation to the first named part as the conduit curves, both said parts intersecting the plane of the axis of the conduit in substantially triangular sections on opposite sides of the cable, whereby the arcuate zone of the conduit between the cable and the center of curvature has a decreasing mean length proportionate to the curvature whereby the length of the cable housed within the conduit in straight line substantially equals the length of cable housed within the conduit in curvature.

14. The combination of a cable and a flexible conduit comprising cooperative parts engaging each other, one of said parts encircling and engaging the cable particularly in curvature and presenting a smooth rounded surface thereto for slidably supporting said cable at least in curvature, the other of said parts being laterally shiftable with relation to the first named part as the conduit curves, both said parts intersecting the plane of the axis of the conduit in substantially triangular sections on opposite sides of the cable, the apex of the former part pointing outwardly and the apex of the latter part pointing inwardly, both said parts having curved surfaces engaging each other, whereby the arcuate zone of the conduit between the cable and the center of curvature has a decreasing mean length proportionate to the curvature whereby the length of cable housed within the conduit in straight line substantially equals the length of cable housed within the conduit in curvature.

In testimony whereof, I hereunto affix my signature.

FREDERIC M. BOSWORTH.